US012693560B2

(12) United States Patent
Hu et al.

(10) Patent No.: US 12,693,560 B2
(45) Date of Patent: *Jul. 28, 2026

(54) BACKLIGHT MODULE INCLUDING ANGULAR DEFLECTION FILM AND DISPLAY DEVICE INCLUDING THE SAME

(71) Applicant: WUHAN CHINA STAR OPTOELECTRONICS TECHNOLOGY CO., LTD., Wuhan (CN)

(72) Inventors: Xinpei Hu, Wuhan (CN); Hailong Pan, Wuhan (CN); Guangkun Liu, Wuhan (CN); Fancheng Liu, Wuhan (CN); Guowei Zha, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/204,414

(22) Filed: May 9, 2025

(65) Prior Publication Data

US 2025/0264763 A1     Aug. 21, 2025

Related U.S. Application Data

(63) Continuation of application No. 18/566,067, filed as application No. PCT/CN2023/128748 on Oct. 31, 2023, now Pat. No. 12,321,062.

(30) Foreign Application Priority Data

Sep. 26, 2023     (CN) .......................... 202311264706.4

(51) Int. Cl.
G02F 1/1335     (2006.01)
F21V 8/00     (2006.01)
G02B 27/00     (2006.01)

(52) U.S. Cl.
CPC ..... *G02F 1/133607* (2021.01); *G02B 6/0053* (2013.01); *G02B 27/0075* (2013.01)

(58) Field of Classification Search
CPC .......... G02B 3/08; G02B 5/045; G02B 6/016; G02B 6/0036; G02B 6/0038;
(Continued)

(56) References Cited

U.S. PATENT DOCUMENTS

2003/0058532 A1* 3/2003 Suzuki ................. G03B 21/625
359/455
2005/0270761 A1* 12/2005 Kung ..................... G09F 13/04
349/97
(Continued)

FOREIGN PATENT DOCUMENTS

CN     1467787 A     1/2004
CN     1643449 A     7/2005
(Continued)

OTHER PUBLICATIONS

International Search Report in International application No. PCT/CN2023/128748, mailed on Jun. 26, 2024.
(Continued)

*Primary Examiner* — Keith G. Delahoussaye
(74) *Attorney, Agent, or Firm* — PV IP PC; Christopher S. Ruprecht; Wei Te Chung

(57) ABSTRACT

A backlight module and a display device are provided in the present application. In the backlight module, a light modulation surface of the annular light modulation portion is connected to an end of a corresponding light incident surface away from a physical center, and in a direction from the
(Continued)

physical center to the annular light modulation portion, a degree of an acute angle between the light modulation surface and the light incident surface is sequentially increased; or, a light modulation surface corresponding to the annular light modulation portion is connected to an end of a corresponding light incident surface near the physical center, and in the direction from the physical center to the annular light modulation portion, the degree of the acute angle between the light modulation surface and the light incident surface is sequentially increased.

19 Claims, 4 Drawing Sheets

(58) Field of Classification Search
CPC .............. G02B 6/0053; G02B 27/0972; G02B 27/0075; G02B 27/45
USPC ......................................................... 362/606
See application file for complete search history.

(56) References Cited

U.S. PATENT DOCUMENTS

| | | | | |
|---|---|---|---|---|
| 2010/0253591 A1* | 10/2010 | Hwu | ...................... | G02B 27/40 |
| | | | | 345/1.3 |
| 2021/0003874 A1 | 1/2021 | Chen | | |

FOREIGN PATENT DOCUMENTS

| | | | |
|---|---|---|---|
| CN | 106680916 | A | 5/2017 |
| CN | 107247361 | A | 10/2017 |
| CN | 108469642 | A | 8/2018 |
| CN | 210954396 | U | 7/2020 |
| CN | 114415376 | A | 4/2022 |
| CN | 216956415 | U | 7/2022 |
| CN | 116088193 | A | 5/2023 |
| CN | 116106995 | A | 5/2023 |
| JP | 2008311032 | A | 12/2008 |
| WO | 2021077850 | A1 | 4/2021 |

OTHER PUBLICATIONS

Written Opinion of the International Search Authority in International application No. PCT/CN2023/128748, mailed on Jun. 26, 2024.
Chinese Office Action issued in corresponding Chinese Patent Application No. 202311264706.4 dated Apr. 2, 2026, pp. 1-9.

* cited by examiner curve A: principal ray angle requirement
curve B: principal ray angle simulation

BACKLIGHT MODULE INCLUDING ANGULAR DEFLECTION FILM AND DISPLAY DEVICE INCLUDING THE SAME

This application is a continuation of U.S. application Ser. No. 18/566,067, filed on Nov. 30, 2021, which claims priority to Chinese Patent Application No. 202311264706.4 filed on Sep. 26, 2023, and an International Application No. PCT/CN2023/128748 filed on Oct. 31, 2023. The entire disclosures of the above applications are incorporated herein by reference.

TECHNICAL FIELD

The present application relates to the field of display technologies, and more particularly, to a backlight module and a display device.

BACKGROUND

In recent years, Virtual reality (VR) technology is developed rapidly, a VR head mounted display takes an increasing market share, and an image display effect is becoming more and more realistic, thereby providing a brand-new experience for a user. A liquid crystal display (LCD) is widely used in virtual reality for its high picture quality and high brightness. In order to obtain a good viewing experience, the VR LCD panel requires an ultra-high-resolution screen. However, as the resolution increases, the transmittance of the liquid crystal panel decreases. Meanwhile, since the solid angle corresponding to the pupil of the human eye is small, only the light distributed at the specific luminance angle can be captured by the viewer. In the current mainstream backlight module, the light emitted from the backlight module is concentrated in the direction toward the surface normal, which causes the brightness of the VR LCD panel at the off-center field of view to be relatively low, resulting in the problem that the light efficiency utilization rate of the backlight module in the VR LCD device is low. This problem needs to be solved urgently.

TECHNICAL PROBLEM

The present application provides a backlight module and a display device to effectively resolve the problem of low light efficiency utilization rate in a VR LCD backlight module.

SUMMARY

In an aspect, the present application provides a backlight module, wherein the backlight module comprises: a backlight having a light output side; an angular deflection film disposed on the light output side of the backlight, the angular deflection film is parallel to the backlight; the angle deflection film comprises a light modulation layer including a plurality of annular light modulation portions disposed on a common horizontal plane, the plurality of annular light modulation portions has a common physical center; each of the plurality of annular light modulation portions comprises a light incident surface and a light modulation surface, wherein the light incident surface is parallel to the backlight, the light modulation surface and the light incident surface have a preset acute included angle, the light modulation surface is disposed on a side of the light incident surface away from the backlight, and an orthographic projection of the light modulation surface on the light incident surface covers the light incident surface; wherein in the plurality of annular light modulation portions, the light modulation surface corresponding to each of the plurality of annular light modulation portions is connected to an end of a corresponding light incident surface away from a physical center, and in a direction from the physical center to the annular light modulation portion, a degree of an acute included angle between the light modulation surface and the light incident surface is sequentially increased; or, in the plurality of annular light modulation portions, a light modulation surface corresponding to each of the plurality of annular light modulation portions is connected to an end of a corresponding light incident surface near the physical center, and in the direction from the physical center to the annular light modulation portion, the degree of the acute included angle between the light modulation surface and the light incident surface is sequentially increased.

In some embodiments, in a direction perpendicular to the backlight, in any cross-section of the annular light modulation portion passing through the physical center, the acute included angle between the light modulation surface and the light incident surface is constant.

In some embodiments, an orthographic projection of an edge of the annular light modulation portion on the backlight is circular.

In some embodiments, in the direction perpendicular to the backlight, a cross-section of the annular light modulation portion passing through the physical center is a right triangle, the right triangle comprises a first straight side, a first hypotenuse, and a second straight side, wherein the first straight side corresponds to the light incident surface, and the first hypotenuse corresponds to the light modulation surface, wherein in the direction from the physical center to the annular light modulation portion, the cross-section of the plurality of annular light modulation portions is arranged in sequence to define a plurality of right triangles, and in the plurality of right triangles arranged in sequence, lengths of the first straight sides are equal, and lengths of the second straight sides are gradually increased; or, in the direction from the physical center to the annular light modulation portion, a plurality of right triangles is formed in a cross-section of the plurality of annular light modulation portions in sequence, and in the plurality of right triangles arranged in sequence, the lengths of the first straight sides are equal, and the lengths of the first straight sides are gradually decreased.

In some embodiments, in each of the right triangles, a length of the first straight side is greater than a length of the second straight side, and a ratio of the second straight side to the first straight side is less than 0.6.

In some embodiments, an emitted light of the backlight comprises a first emitted light, an included angle $\gamma$ is defined between the first emitted light and a normal direction of the backlight, wherein $\gamma$ ranges from $-1°$ to $-1°$, an emitted light emitted from the annular light modulation portion after the first emitted light is deflected by the annular light modulation portion is a second emitted light, an included angle between the second emitted light and the normal direction of the backlight is $\beta$, wherein in the direction from the physical center to the annular light modulation portion, $\beta$ corresponding to the plurality of annular light modulation portions sequentially arranged is gradually increased, and $\beta$ ranges from $0°$ to $13°$, the refractive index of the annular light modulation portion is n, and the included angle of the acute included angle is $\alpha$, and a formula is satisfied with:

$$\tan\alpha = \frac{\sin\beta - \sin\gamma}{\sqrt{n^2 - (\sin\gamma)^2} - \cos\beta}.$$

In some embodiments, in the direction form the physical center to the annular light modulation portion, an angle difference between an included angle $\beta$ corresponding to a x-th annular light modulation portion and an included angle $\beta$ corresponding to a x+1-th annular light modulation portion is greater than an angle difference between an included angle $\beta$ corresponding to a y-th annular light modulation portion and an included angle $\beta$ corresponding to a y+1-th annular light modulation portion, wherein x and y are satisfied with: x>y≥1.

In some embodiments, in the direction form the physical center to the annular light modulation portion, an angle difference between included angles $\beta$ corresponding to two adjacent annular light modulation portions is a, wherein a is satisfied with: 0.018°<a<0.25°.

In some embodiments, in a direction form the physical center to the annular light modulation portion, the cross-sections of the plurality of the annular light modulation portions are arranged in sequence to define right triangles in number of z, wherein z is satisfied with: 50≤z≤100.

In some embodiments, in the direction form the physical center to the annular light modulation portion, lengths of the first straight sides are equal and lengths of the second straight sides are gradually increased; wherein in the direction form the physical center to the annular light modulation portion, a length difference between two adjacent second straight sides is b, wherein b is satisfied with: 0.003 mm<b<0.03 mm.

In some embodiments, in the direction form the physical center to the annular light modulation portion, the lengths of the first straight sides are equal, and the lengths of the first straight sides are gradually decreased; wherein in a direction form the physical center to the annular light modulation portion, a length difference between two adjacent first straight sides is c, wherein c is satisfied with: 0.04 mm<c<2 mm.

In some embodiments, the angular deflection film further comprises a substrate provided on the light output side of the backlight, the light modulation layer is provided on a side of the substrate away from the backlight, and the light incident surface is adjacent to a surface of the substrate away from the backlight, and a refractive index of the substrate is different from a refractive index of the light modulation layer.

In some embodiments, the refractive index of the substrate is greater than the refractive index of the light modulation layer.

In some embodiments, the backlight comprises a reflective sheet, an array of light emitting cells, and a diffuser sheet, wherein the array of light emitting cells is disposed on a side of the reflective sheet, the diffuser sheet is disposed on a side of the array of light emitting cells away from the reflective sheet, wherein a side of the diffuser sheet away from the array of light emitting cells is the light output side.

In some embodiments, the backlight comprises a lamp bar, a light guide plate, and a prism film, wherein at least one end of the light guide plate is provided with the lamp bar, and the prism film is provided on a side of the light guide plate, wherein a side of the prism film away from the light guide plate is the light output side.

In another aspect, the present application provides a display device including two display modules symmetrically disposed, each display module including a display panel and a backlight module according to any one of the above.

BENEFICIAL EFFECT

The present application provides a backlight module and a display device, wherein the backlight module comprises: a backlight having a light output side; an angular deflection film disposed on the light output side of the backlight, the angular deflection film is parallel to the backlight; the angle deflection film comprises a light modulation layer including a plurality of annular light modulation portions disposed on a common horizontal plane, the plurality of annular light modulation portions has a common physical center; each of the plurality of annular light modulation portions comprises a light incident surface and a light modulation surface, wherein the light incident surface is parallel to the backlight, the light modulation surface and the light incident surface have a preset acute included angle, the light modulation surface is disposed on a side of the light incident surface away from the backlight, and an orthographic projection of the light modulation surface on the light incident surface covers the light incident surface; wherein in the plurality of annular light modulation portions, the light modulation surface corresponding to each of the plurality of annular light modulation portions is connected to an end of a corresponding light incident surface away from a physical center, and in a direction from the physical center to the annular light modulation portion, a degree of an acute included angle between the light modulation surface and the light incident surface is sequentially increased; or, in the plurality of annular light modulation portions, a light modulation surface corresponding to each of the plurality of annular light modulation portions is connected to an end of a corresponding light incident surface near the physical center, and in the direction from the physical center to the annular light modulation portion, the degree of the acute included angle between the light modulation surface and the light incident surface is sequentially increased. According to the backlight module provided in the present application, since in a plurality of annular light modulation portions the light modulation surface corresponding to each of the plurality of annular light modulation portions is connected to an end of a corresponding light incident surface away from a physical center, or the light modulation surface corresponding to each of the plurality of annular light modulation portions is connected to an end of a corresponding light incident surface near the physical center, and in the direction from the physical center to the annular light modulation portion, the degree of the acute included angle between the light modulation surface and the light incident surface is sequentially increased, the emitted light emitted from the annular light modulation portion farther away from physical center exhibits a more substantial angular deflection, thereby the brightness of an edge region of the light modulation layer is increased and the light efficiency utilization rate of the backlight module is improved.

BRIEF DESCRIPTION OF THE DRAWINGS

In order to explain the technical solution in the embodiments of the present application more clearly, the drawings required for the description of the embodiments are briefly described. It is apparent that the drawings in the following description are merely some of the embodiments of the present application, and other drawings may be made to those skilled in the art without involving any inventive effort.

Figure 1:
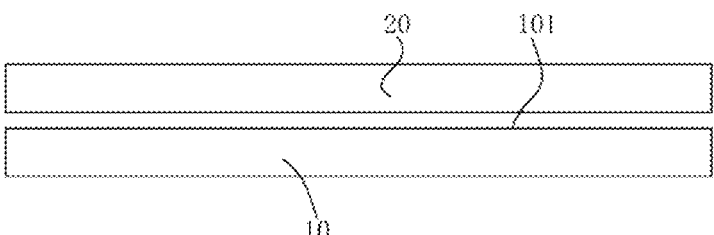
FIG. 1 is a schematic cross-sectional diagram of a backlight module according to embodiment 1 of the present application.

REFERENCE SIGNS a backlight 10; a light output side 101; a reflective sheet 11; an array of light emitting cells 12; a diffusion sheet 13; a light bar 14; a light guide plate 15; a prism film 16; an angle deflection film 20; a substrate 21; a light modulation layer 22; a physical center 220; an annular light modulation portion 221; an light incident surface 222; a light modulation surface 223; a right triangle 224; a first straight side 225; a second straight side 226; a first hypotenuse 227; an acute included angle α; and an included angle β between a second emitted light and a normal direction of light output side;

DETAILED DESCRIPTION

In the following, the technical solutions in the embodiments of the present application are clearly and completely described with reference to the drawings in the embodiments of the present application. It is apparent that the described embodiments are merely a part of the embodiments of the present application, rather than all the embodiments. Based on the embodiments in the present application, all other embodiments obtained by those skilled in the art without involving any inventive effort are within the scope of the present application. Furthermore, it should be understood that the specific embodiments described herein are only used to illustrate and explain this application, and are not used to limit this application. In this application, unless otherwise stated, directional words such as "up" and "down" usually refer to the up and down in the actual operating or working state of the device, specifically the drawing direction in the drawings; while "inside" and "outside" refer to the outline of the device.

The following disclosure provides different embodiments or examples for implementing the different structures of the present application. In order to simplify the disclosure of the present application, components and arrangements of specific examples are described below. It should be understood, they are merely examples and are not intended to limit the application. In addition, the present application may repeat reference numerals and/or reference letters in different examples, and this repetition is for the purpose of simplicity and clarity, and does not in itself indicate the relationship between the various embodiments and/or arrangements discussed. In addition, the present application provides examples of various specific processes and materials, but those skilled in the art can realize the application of other processes and/or the use of other materials. The following are detailed descriptions respectively, and it should be noted that the description order of the following embodiments is not taken as a limitation on the preferred order of the embodiments.

Embodiment 1

Figure 2:
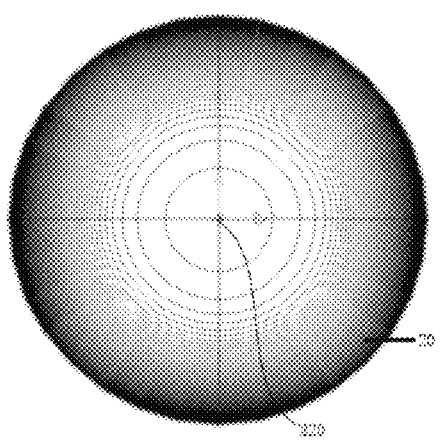
FIG. 2 is a top view of an angular deflection film according to embodiment 1 of the present application.
Figure 3:
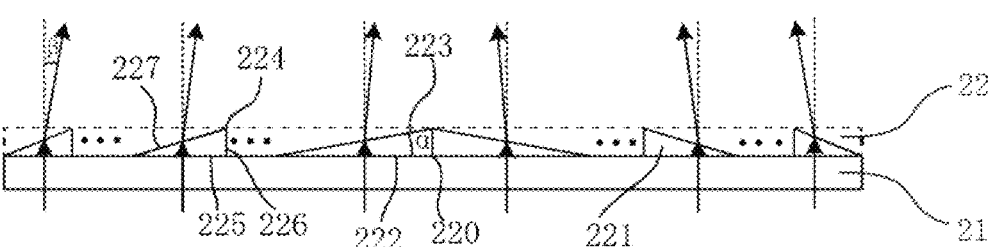
FIG. 3 is a schematic cross-sectional diagram of an angular deflection film according to embodiment 1 of the present application.
Figure 4:
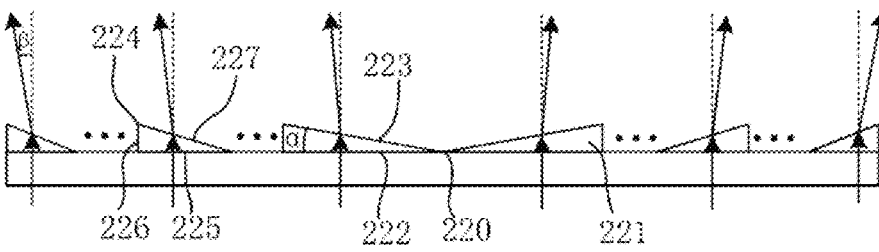
FIG. 4 is a schematic cross-sectional diagram of another angular deflection film according to embodiment 1 of the present application.

FIG. 1 is a schematic cross-sectional diagram of a backlight module according to embodiment 1 of the present application; FIG. 2 is a top view of an angular deflection film according to embodiment 1 of the present application; FIG. 3 is a schematic cross-sectional diagram of an angular deflection film according to embodiment 1 of the present application; and FIG. 4 is a schematic cross-sectional diagram of another angular deflection film according to embodiment 1 of the present application. As shown in FIG. 1 to FIG. 4, a first embodiment of the present application provides a backlight module, the backlight module includes a backlight 10 and an angle deflection film 20, the backlight has a light output side 101, the angular deflection film 20 is disposed on the light output side 101 of the backlight 10, and the angular deflection film 20 is parallel to the backlight 10. The angle deflection film 20 includes a light modulation layer 22 including a plurality of annular light modulation portions 221 disposed on a common horizontal plane, and the plurality of annular light modulation portions 221 has a common physical center 220. Each of the plurality of annular light modulation portions 221 comprises a light incident surface 222 and a light modulation surface 223, wherein the light incident surface 222 is parallel to the backlight 10, a preset acute included angle α is defined between the light modulation surface 223 and the light incident surface 222, the light modulation surface 223 is disposed on a side of the light incident surface 222 away from the backlight 10, and an orthographic projection of the light modulation surface 223 on the light incident surface 222 covers the light incident surface 222. In the plurality of annular light modulation portions 221, the light modulation surface 223 of each of the plurality of annular light modulation portions 221 is connected to an end of a corresponding light incident surface 222 away from a physical center 220, and in a direction from the physical center 220 to the annular light modulation portion, a degree of an acute included angle α between the light modulation surface 223 and the light incident surface 222 is sequentially increased. Alternatively, in the plurality of annular light modulation portions 221, a light modulation surface 223 of each of the plurality of annular light modulation portions 221 is connected to an end of a corresponding light incident surface 222 near the physical center 220, and in the direction from the physical center 220 to the annular light modulation portion, the degree of the acute included angle α between the light modulation surface 223 and the light incident surface 222 is sequentially increased.

In the backlight module provided in the present application, in a case that the light modulation surface 223 corresponding to each of the plurality of annular light modulation portions 221 is connected to the end of a corresponding light incident surface 222 away from the physical center 220, since the light modulation surface 223 and the light incident surface 222 have a preset acute included angle α, the annular light modulation portions 221 have the same light modulation manner for the emitted light of the backlight 10, and each of the annular light modulation portions 221 has a constricted light modulation structure, which enables the backlight module to have a narrow field of view (FOV). On this basis, since the degree of the acute included angle α between the light modulation surface 223 and the light incident surface 222 is sequentially increased in the direction from the physical center 220 to the annular light modulation portion, it is possible to deflect the emitted light emitted by the annular light modulation portion 221 farther away from the physical center 220 by a larger angle, thereby the brightness of the edge region of the light modulation layer 22 is increased and the light efficiency utilization rate of the backlight module is improved.

In the backlight module provided in the present application, in a case that the light modulation surface 223 corresponding to each of the plurality of annular light modulation portions 221 is connected to the end of a corresponding light incident surface 222 near the physical center 220, since the light modulation surface 223 and the light incident surface 222 have a preset acute included angle α, the annular light modulation portions 221 have the same light modulation manner for the emitted light of the backlight 10, and each of the annular light modulation portions 221 has a diffusive light modulation structure, which enables the backlight module to have a wide field of view. On this basis, since the degree of the acute included angle α between the light modulation surface 223 and the light incident surface 222 is sequentially increased in the direction from the physical center 220 to the annular light modulation portion, it is possible to deflect the emitted light emitted by the annular light modulation portion 221 farther away from the physical center 220 by a larger angle, thereby the brightness of the edge region of the light modulation layer 22 is increased and the light efficiency utilization rate of the backlight module is improved.

In some embodiments of the present application, in any cross-section of the annular light modulation portion 221 passing through the physical center 220, the acute included angle α between the light modulation surface 223 and the light incident surface 222 is constant.

In the backlight module provided in the present application, in any cross-section of the annular light modulation portion 221 passing through the physical center 220, the acute included angle α between the light modulation surface 223 and the light incident surface 222 is constant. Therefore, in any cross-section of the annular light modulation portion 221 passing through the physical center 220 in the direction perpendicular to the backlight, the light modulation surface 223 has the same deflection angle to the light emitted from the backlight 10 at a fixed angle, which can make the polarization effect of the light modulation surface 223 of the annular light modulation portion 221 consistent in each region, and is beneficial to improving the brightness uniformity of each region of the annular light modulation portion 221. In addition, the manufacturing process of each annular light modulation portion 221 can be kept consistent, which is beneficial to improving the process efficiency.

In some embodiments of the present application, an orthographic projection of an edge of the annular light modulation portion on the backlight is circular.

In the related art, the display field of the VR LCD panel is a circular field of view adapted to the human eye, and in the present application, by setting the orthogonal projection of the edge of the annular light modulation part 221 on the backlight to be circular, the backlight module can be adapted to the VR LCD panel.

In some embodiments of the present application, In a direction perpendicular to the backlight, a cross-section of the annular light modulation portion 221 passing through the physical center 220 is a right triangle 224. The right triangle 224 comprises a first straight side 225, a first hypotenuse 227, and a second straight side 226, wherein the first straight side 225 corresponds to the light incident surface 222, and the first hypotenuse 227 corresponds to the light modulation surface 223. In the direction from the physical center 220 to the annular light modulation portion, a cross-section of a plurality of right triangles 224 is in a plurality of annular light modulation portions 221 arranged in sequence, and in the plurality of right triangles 224 arranged in sequence, the lengths of the second straight sides 226 are equal, and the lengths of the first straight sides 225 are gradually decreased.

In the backlight module provided in the present application, in the backlight module, a cross-section of the annular light modulation portion 221 passing through the physical center 220 is a right triangle 224, the right triangle 224 comprises a first straight side 225, a first hypotenuse 227, and a second straight side 226, wherein the first straight side 225 corresponds to the light incident surface 222, and the first hypotenuse 227 corresponds to the light modulation surface 223, that is, an included angle between the first straight side 225 and the first hypotenuse 227 is an acute included angle α.

In the backlight module provided in the present application, in the direction from the physical center 220 to the annular light modulation portion, a cross-section of a plurality of right triangles 224 is in a plurality of annular light modulation portions 221 arranged in sequence. That is, any two adjacent right triangles 224 are provided adjacent to each other in the direction from the physical center 220 to the annular light modulation portion. There is no interval between any two adjacent right triangles 224. This structure can make the emitted light emitted from the light output side 101 of the backlight only be emitted to the outside of the backlight module after the light modulation function of the annular light modulation part 221, thus ensuring the light modulation comprehensiveness of the light modulation layer 22.

Secondly, since in the direction from the physical center 220 to the annular light modulation portion 221, the lengths of the second straight sides 226 are equal and the lengths of the first straight sides 225 are gradually decreased, so that, in the direction from the physical center 220 to the annular light modulation portion 221, the convergence ability or the divergence ability of each right angle triangle 224 to the emitted light of the backlight 10 are gradually increased, that is, when the light modulation manner of the right angle triangle 224 to the emitted light of the backlight 10 is the convergence type, the convergence ability of the annular light modulation portion 221 to the emitted light of the backlight 10 is gradually increased with the distance from the physical center 220 is greater, so that the brightness of the backlight module further away from the physical center 220 can be enhanced, thereby a problem in the related art that the brightness at the off-center field of view is low is alleviated; when the light modulation manner of the right angle triangle 224 to the emitted light of the backlight 10 is the divergence type, the divergence ability of the annular light modulation portion 221 to the emitted light of the backlight 10 is gradually enhanced with the distance from the physical center 220 is greater, so that the brightness of the backlight module further away from the physical center 220 can be enhanced, thereby the problem of low brightness at the off-center field of view in the related art is alleviated.

Specifically, referring to FIG. 3, in the backlight module provided in the present application, a first straight side 225 of each right triangle 224 is provided at a side of a second straight side 226 of each right triangle 224 away from the physical center 220. In this case, the right triangle 224 modulates the emitted light from the backlight 10 to be of a convergence type, and the field of view of the display device corresponding to the right triangle 224 has a small angle, for example, less than 90°. In this case, in the direction from the physical center 220 to the annular light modulation portion 221, the lengths of the first straight sides 225 are gradually decreased, so that the convergence ability of the annular light modulation portion 221 to the emitted light of the backlight 10 is gradually enhanced with the distance from the physical center 220, whereby the brightness of the backlight module further away from the physical center 220 can be enhanced, thereby the problem of low brightness at the off-center field of view in the related art is alleviated.

Specifically, referring to FIG. 4, in the backlight module provided in the present application, a first straight side 225 of each right triangle 224 is provided at a side of a second straight side 226 of each right triangle 224 away from the physical center 220. In this case, the right triangle 224 modulates the emitted light from the backlight 10 to be of a divergence type, and the field of view of the display device corresponding to the right triangle 224 has a large angle, for example, greater than 90°. In this case, in the direction from the physical center 220 to the annular light modulation portion 221, the lengths of the first straight sides 225 are gradually decreased, so that the convergence ability of the annular light modulation portion 221 to the emitted light of the backlight 10 is gradually enhanced with the distance from the physical center 220, whereby the brightness of the backlight module further away from the physical center 220 can be enhanced and the problem of low brightness at the off-center field of view in the related art is alleviated.

It should be noted that in other embodiments of the present application, in a direction perpendicular to the backlight, the cross-section of the annular light modulation portion 221 passing through the physical center 220 may be an obtuse triangle, and the obtuse triangle may still satisfy a case in which the orthographic projection of the light modulation surface 223 on the light incident surface 222 covers the light incident surface 222.

In some embodiments of the present application, the angle deflection film 20 further includes a substrate 21 disposed on the light output side 101 of the backlight 10, the light modulation layer 22 is disposed on the side of the substrate 21 away from the backlight 10, and the light incident surface 222 is adjacent to a surface of the substrate 21 away from the backlight 10, and a refractive index of the substrate 21 is the same as or different from a refractive index of the light modulation layer 22.

In the backlight module provided in the present application, in a case that the refractive index of the substrate 21 is the same as the refractive index of the light modulation layer 22, the substrate 21 and the light modulation layer 22 can be manufactured at the same time to be integrally formed; in a case that the refractive index of the substrate 21 and the refractive index of the light modulation layer 22 are different, the difference between the refractive index of the substrate 21 and the refractive index of the light modulation layer 22 can prevent the emitted light at a large angle in the backlight 10 (for example, the emitted light nearly vertically incident on the substrate 21) from emitting through the light modulation layer 22, thereby filtering stray light.

In some embodiments, the refractive index of the substrate 21 is greater than the refractive index of the light modulation layer 22. According to the present application, by making the refractive index of the substrate 21 greater than the refractive index of the light modulation layer 22, the above-described purpose of filtering stray light can be achieved.

In some embodiments of the present application, in each of the right triangles 224, the length of the first straight side 225 is less than the length of the second straight side 226, wherein the ratio of the first straight side 225 to the second straight side 226 is less than 0.6.

In the backlight module provided in the present application, by controlling the ratio of a straight side having a longer length to a straight side having a shorter length within a range of less than 0.6, the manufacturing difficulty of the annular light modulation portion 221 can be effectively reduced.

Further, since a straight side having a longer length is the first straight side 225, and the first straight side 225 is attached to the surface of the substrate 21, the present application can improve the stability of the annular light modulation portion 221 and prolong the service life of the backlight module by providing a longer length of the first straight side 225 attached to the surface of the substrate 21.

In some embodiments of the present application, an emitted light of the backlight 10 comprises a first emitted light, an included angle $\gamma$ is defined between the first emitted light and a normal direction perpendicular to the light output side 101, wherein $\gamma$ ranges from $-1°$ to $1°$, an emitted light emitted from the annular light modulation portion 221 after the first emitted light is deflected by the annular light modulation portion 221 is a second emitted light, an included angle between the second emitted light and the normal direction perpendicular to the light output side 101 is $\beta$, wherein in the direction from the physical center 220 to the annular light modulation portion 221, $\beta$ corresponding to the plurality of annular light modulation portions 221 sequentially arranged is gradually increased, and $\beta$ ranges from 0° to 13°, a refractive index of the annular light modulation portion 221 is n, and an acute included angle is α, and a formula is satisfied with:

$$\tan\alpha = \frac{\sin\beta - \sin\gamma}{\sqrt{n^2 - (\sin\gamma)^2} - \cos\beta}.$$

In the backlight module provided in the present application, the first emitted light is the light with the highest brightness in the emitted light at a certain light source point on the light output side of the backlight. Conventionally, the angle γ between the first emitted light and the normal direction of the light output side 101 is 0°; in a special case, due to the design problem of the backlight, the first emitted light may be shifted, in this case, the angle γ between the first emitted light and the normal direction of the light output side 101 is within the range [−1°, −1°], except for 0°.

In the backlight module provided in the present application, the larger the angle β between the second emitted light and the normal direction of the light output side 101 is, the stronger the deflection ability of the annular light modulation portion 221 to the first emitted light is. In the direction from the physical center 220 to the annular light modulation portion 221, β corresponding to the annular light modulation portions 221 arranged in sequence is gradually increased, so that the farther away from the physical center 220, the stronger the deflection ability of the annular modulation portion 221 to the emitted light of the backlight 10 can be, thereby improving the backlight brightness of the edge region and improving the optical efficiency of the backlight module.

Figure 5:
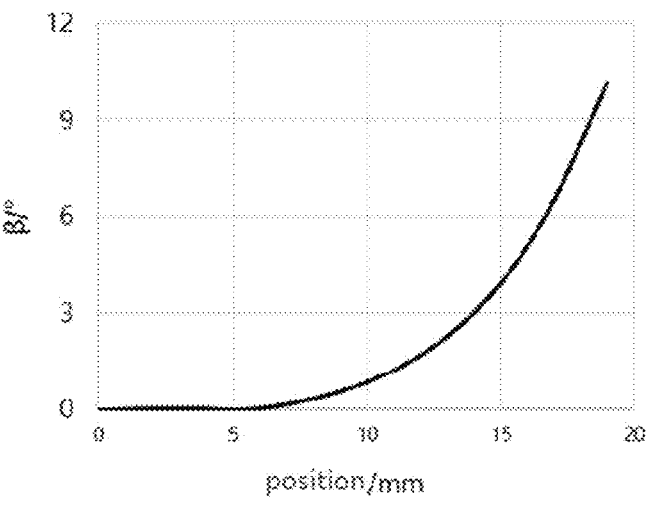
FIG. 5 is a simulation schematic diagram of the relationship between β and a distance from a light modulation point to a physical center of a backlight module according to embodiment 1 of the present application.

FIG. 5 is a simulation schematic diagram of the relationship between β and a distance from a light modulation point to a physical center of a backlight module according to embodiment 1 of the present application. As shown in FIG. 5, the relationship between a distance from the second emitted light in the backlight module to the physical center 220 and the included angle β between the second emitted light and the normal direction of the light output side 101 is a parabolic distribution as shown in FIG. 5. In the present application, by controlling β within the range 0° to 13°, the light modulation efficiency of the annular light modulation portion 221 can be improved. In a case that the value of β is determined, the value of the predetermined included angle α can be derived from $$\tan\alpha = \frac{\sin\beta - \sin\gamma}{\sqrt{n^2 - (\sin\gamma)^2} - \cos\beta}.$$

In some embodiments of the present application, in the direction form the physical center 220 to the annular light modulation portion 221, an angle difference between the β corresponding to a x-th annular light modulation portion 221 and the β corresponding to a x+1-th annular light modulation portion 221 is greater than an angle difference between the β corresponding to a y-th annular light modulation portion 221 and the β corresponding to a y+1-th annular light modulation portion 221, wherein x>y≥1.

In the backlight module provided in the present application, it can be seen from FIG. 5, in a case that β is within a range of 0° to 12°, the slope of the line representing the relationship between β and a distance from a light modulation point to a physical center of a backlight module is continuously increased, and the angle difference between the β corresponding to a x-th annular light modulation portion 221 and the β corresponding to a x+1-th annular light modulation portion 221 is greater than an angle difference between the β corresponding to a y-th annular light modulation portion 221 and the β corresponding to a y+1-th annular light modulation portion 221 in the direction form the physical center 220 to the annular light modulation portion 221, so that the light deflection effect of the annular light modulation portion 221 of the light modulation layer 22 in the application is more suitable for the parabola, thereby further improving the optical efficiency of the backlight module.

In some embodiments of the present application, in the direction form the physical center 220 to the annular light modulation portion 221, the angle difference between the β corresponding to two adjacent annular light modulation portions 221 is a, wherein a is satisfied with: 0.018<a<0.25.

In the backlight module provided in the present application, the greater the angle difference a between the β corresponding to the two adjacent annular light modulation portions 221 in the direction form the physical center 220 to the annular light modulation portion 221, the greater the difference in the deflection ability of the two adjacent annular light modulation portions 221 to the emitted light of the backlight 10 is. In case that the difference is less than a certain threshold value, obvious sawtooth gradient may be easily appeared, and the optical effect of the backlight 10 is affected. In case that the difference is less than a certain threshold, diffraction problems may be easily occurred, and the optical effect of the backlight 10 is reduced. According to the present application, by controlling the angle difference a between the β corresponding to the two adjacent annular light modulation portions 221 within a range of 0.018 to 0.25, the optical efficiency of the backlight module can be improved and the optical effect of the backlight module is improved.

In some embodiments of the present application, in the direction form the physical center 220 to the annular light modulation portion 221, the cross-sections of the plurality of annular light modulation portions 221 are arranged in sequence to define right triangles 224 in number of z, wherein is satisfied with: 50≤z≤100.

In the backlight module provided in the present application, the number of the annular light modulation portions 221 is greater in the direction form the physical center 220 to the annular light modulation portion 221, the area division of the light modulation layer 22 is finer, and the angle difference a between the β corresponding to two adjacent annular light modulation portions 221 is theoretically smaller. However, an excessive number of the annular light modulation portions 221 increases the processing difficulty and may cause diffraction problems. Therefore, the present application can improve the optical utilization rate of the backlight module while ensuring the optical effect of the backlight module by controlling the number of the annular light modulation portions 221 within the range of 50 to 100.

In some embodiments of the present application, in the direction form the physical center 220 to the annular light modulation portion 221, the lengths of the second straight sides 226 are equal, and the lengths of the first straight sides 225 are gradually decreased; wherein in the direction form the physical center 220 to the annular light modulation portion 221, the length difference between two adjacent first straight sides 225 is c, and c is satisfied with: 0.04<c<2.

Specifically, since both the refractive index of the substrate 21 and the refractive index of the light modulation layer 22 are constant, in a case that the angle γ of the first emitted light relative to a direction perpendicular to the normal direction of the light output side 101 is fixed and the length of the second straight side 226 is fixed, the length of the first straight side 225 is positively related to the value of β. According to the present application, by controlling the length difference between two adjacent first straight sides 225 within the range of 0.04 to 2, it is possible to control the angle difference a between the β corresponding to two adjacent annular light modulation portions 221 by using the length difference between two adjacent first straight sides 225, thereby achieving the purpose of controlling the light deflection capability of each annular light modulation portion 221, and improving the optical utilization rate of the backlight module more easily and efficiently.

Figure 6:
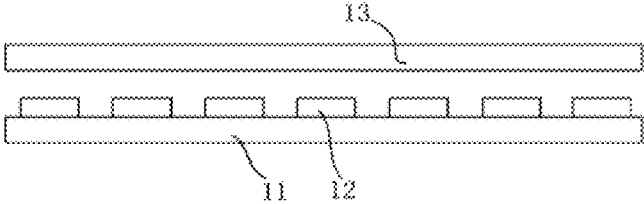
FIG. 6 is a schematic cross-sectional diagram of a backlight according to embodiment 1 of the present application.

In some embodiments of the present application, the backlight 10 is a direct backlight 10. FIG. 6 is a schematic cross-sectional diagram of a backlight according to embodiment 1 of the present application. As shown in FIG. 6, the backlight 10 includes a reflective sheet 11, an array of light emitting cells 12, and a diffuser sheet 13, wherein the array of light emitting cells 12 is disposed on a side of the reflective sheet 11, and the diffuser sheet 13 is disposed on a side of the array of light emitting cell 12 away from the reflective sheet 11, wherein the light output side 101 is a side of the diffuser sheet 13 away from the array of light emitting cell 12.

Figure 7:
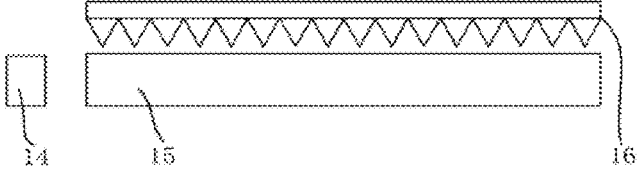
FIG. 7 is a schematic cross-sectional diagram of another backlight according to embodiment 1 of the present application.

It should be understood, the present application does not limit the type of the backlight 10. For example, in other embodiments of the present application, the backlight 10 may also be a side-entry backlight 10. FIG. 7 is a schematic cross-sectional diagram of another backlight according to embodiment 1 of the present application. As shown in FIG. 7, the backlight 10 includes a lamp bar 14, a light guide plate 15, and a prism film 16, wherein at least one section of the light guide plate 15 is provided with the lamp bar 14, and the prism film 16 is provided on a side of the light guide plate 15, wherein a side of the prism film 16 away from the light guide plate 15 is the light output side 101.

Table 1 is a performance comparison table of a backlight module provided in embodiment 1 of the present application and a backlight module with a conventional Fresnel lens in the related art.

TABLE 1

|  | Comparative example | Embodiment 1 |
|---|---|---|
| Optical component | Conventional Fresnel lens | Angle deflection film |
| Focal length | Confocal distance | Non-focal length |
| Deflection angle | Cannot be independently controlled | Single zone controllable without focal plane and focal length limitation |
| Incident light | Parallel light/point light source | Surface light source |
| Application | Focusing/Imaging | Directivity light control |
| Optical effect entering human eye at the same observation position | Collimation BLU: 1 MiniBLU: 1 | Collimation BLU: 2.25 MiniBLU: 1.3 |
| Uniformity of brightness in human eye FOV (taking eye pupil movement of 3 mm as an example) | Collimation BLU: H: 43.8% V: 29% MiniBLU: 67% | Collimation BLU: H: 66.1% V: 66.3% MiniBLU: 80% |

The dimensions of the backlights used in the comparative example and Embodiment 1 in Table 1 are the same, both 2.1 inches, and the types of backlights are the same; the optical component in the comparative example is a conventional Fresnel lens having a focal length of 110 mm, a caliber of 40 mm, and a tooth height of 20 mm; the optical component of Embodiment 1 is an angular deflection film.

Referring to Table 1, a backlight module including a conventional Fresnel lens has a focal length type of confocal length, while the backlight module 10 including an angular deflection film 20 of the present application has no focal length limitation. The type of the light source of the backlight module including the conventional Fresnel lens is a parallel light or a point light source, while the type of the light source of the backlight module 10 including the angle deflection film 20 in this application is surface light source. A backlight module including the conventional Fresnel lens is not capable of directionally controlling light; However, the backlight module 10 including the angle deflection film 20 of the present application can realize directivity light control. Assuming that a backlight module including a conventional Fresnel lens has an Optical effect entering human eye of 1 at an observation position by using a collimated backlight, the Optical effect entering human eye of the backlight module 10 including the angle deflection film 20 in the application can reach 2.25 at the same observation position by using a collimated backlight; assuming that the Optical effect entering human eye of the backlight module including ordinary Fresnel lens at an observation position is 1 by using the mini LED backlight, the Optical effect entering human eye of the backlight module 10 including the angle deflection film 20 in the application can reach 1.3 at the same observation position by using the mini LED backlight. Taking the eye pupil movement of 3 mm as an example, the vertical FOV of the collimated backlight module including ordinary Fresnel lens is only 43.8%. However, the vertical FOV of the collimated backlight of the backlight module 10 including the angle deflection film 20 in the present application is 66.1%. The diagonal FOV of the collimated backlight of the backlight module including ordinary Fresnel lens is only 29%. However, the diagonal FOV of the collimated backlight of the backlight module 10 including the angle deflection film 20 in the present application is 66.3%. The FOV of mini LED backlight with ordinary Fresnel lens backlight module is only 67%. However, the diagonal FOV of the mini LED backlight of the backlight module 10 including the angle deflection film 20 of the present application is 80%.

Figure 8:
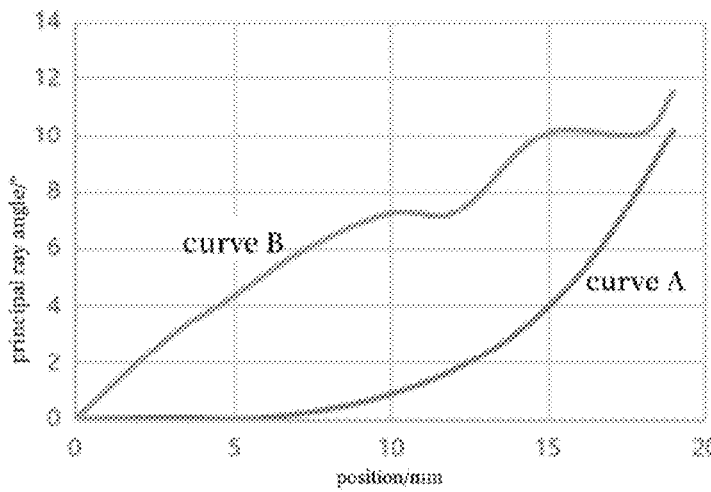
FIG. 8 is a simulation schematic diagram of a principal ray angle of a mini LED backlight with a conventional Fresnel lens in the related art.

In fact, ordinary Fresnel lens gives priority to meet the main optical axis angle deflection requirements of the edge position of backlight module (for example, the deflection angle is 10) by setting structural parameters such as focal length and tooth height, but the main optical axis angles of other positions in backlight module except the edge position cannot be met at the same time. FIG. 8 is a schematic diagram of a principal ray angle simulation of a mini LED backlight with a conventional Fresnel lens in the related art. Referring to FIG. 8, it can be seen that in a case that the backlight is a mini LED backlight, the main light deflection angles (corresponding to curve B) at different positions of the backlight module of the comparative example can hardly meet the requirements of VR optical machines (corresponding to curve A).

Table 2 is a data comparison table between a design requirement value and a measured value of a backlight module provided in Embodiment 1 of the present application. It should be noted that, due to process limitations (the ratio of the second straight side 226 to the first straight side 225 is less than 0.6 in consideration of the tooth depth/width ratio of the single annular light modulation portion 221), a height of the annular light modulation portion 221 within 10 mm from the center of the circle is 13 mm and a height of the annular light modulation portion 221 within 10 mm to 20 mm from the center of the circle is 20 mm.

TABLE 2

|  | Distance from the center of the circle | 0-10 mm | 10-14 mm | 14-20 mm |
|---|---|---|---|---|
| Design | Pitch (μm) | 597 | 258 | 46 |
| requirement | Height (μm) | 13 | 20 | 20 |
| value | Angle | 1.392 | 4.794 | 24.081 |
| Measured value | Pitch (μm) | 596.34 | 257.06 | 46.15 |
|  | Height (μm) | 13.9 | 20.86 | 20.23 |
|  | Angle | 1.388 | 4.81 | 24.3 |

As can be seen from Table 2, in the backlight module provided in the present application, the difference between the measured value and the design requirement value of the principal ray angle is within 0.3° at different positions from the center of the circle.

Figure 9A:
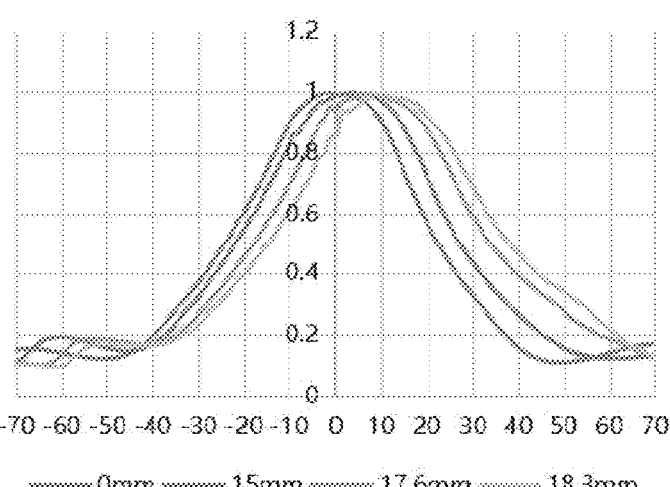
FIG. 9*a* is a light-type simulation diagram of different positions of a backlight module including an angular deflection film according to embodiment 1 of the present application, wherein the backlight module uses a mini LED backlight.
Figure 9B:
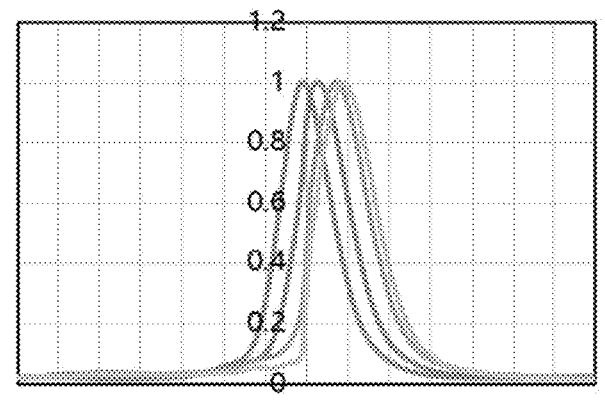
FIG. 9*b* is a light-type simulation diagram of diagonal field of view corresponding to different positions of a backlight module including an angular deflection film according to embodiment 1 of the present application, wherein the backlight module uses a collimated backlight.
Figure 9C:
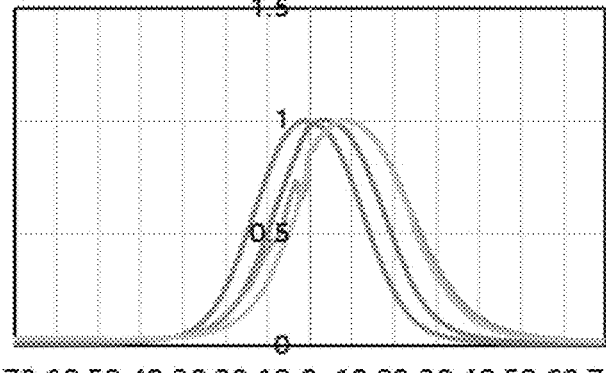
FIG. 9*c* is a light-type simulation diagram of vertical field of view corresponding to different positions of a backlight module including an angle deflection film according to embodiment 1 of the present application, wherein the backlight module uses a collimated backlight.

FIG. 9a is a light-type simulation diagram of different positions of a backlight module including an angular deflection film according to embodiment 1 of the present application, wherein the backlight module uses a mini LED backlight; FIG. 9b is a light-type simulation diagram of diagonal field of view corresponding to different positions of a backlight module including an angular deflection film according to embodiment 1 of the present application, wherein the backlight module uses a collimated backlight; and FIG. 9c is a light-type simulation diagram of vertical field of view corresponding to different positions of a backlight module including an angle deflection film according to embodiment 1 of the present application, wherein the backlight module uses a collimated backlight. Referring to FIG. 9a, FIG. 9b, and FIG. 9c, the angle deflection film 20 of the present application can deflect a main optical axis at different positions of the backlight 10 without a significant change in the light pattern before and after deflection, thereby effectively meeting VR application requirements.

According to a second aspect, an embodiment of the present application further provides a display device including two display modules symmetrically arranged, each display module including a display panel and a backlight module according to any one of the above.

Embodiment 2

Figure 10:
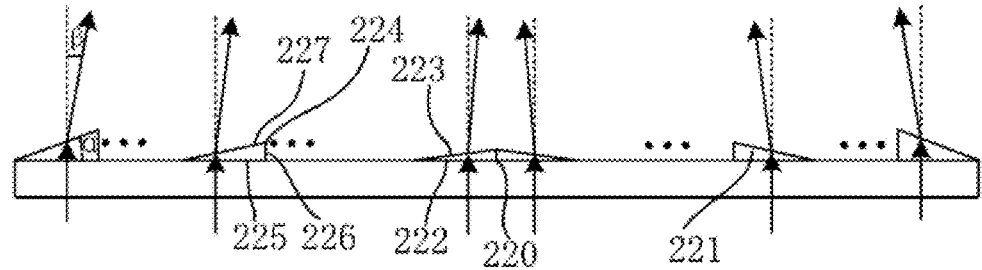
FIG. 10 is a schematic cross-sectional diagram of an angular deflection film according to embodiment 2 of the present application.
Figure 11:
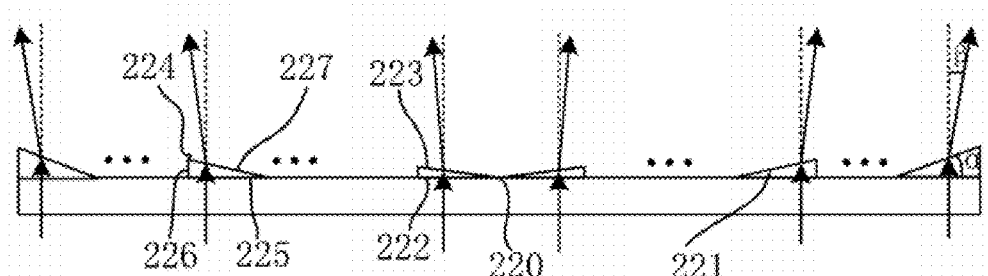
FIG. 11 is a schematic cross-sectional diagram of another angular deflection film according to embodiment 2 of the present application.

FIG. 10 is a schematic cross-sectional diagram of an angular deflection film according to embodiment 2 of the present application; FIG. 11 is a schematic cross-sectional diagram of another angular deflection film according to embodiment 2 of the present application. As shown in FIG. 1, and FIG. 6 to FIG. 11, a second embodiment of the present application provides a backlight module and a display device. The backlight module includes a backlight 10 and an angle deflection film 20, the backlight has a light output side 101, the angular deflection film 20 is disposed on the light output side 101 of the backlight 10, the angular deflection film 20 is parallel to the backlight 10; the angle deflection film 20 comprises a light modulation layer 22 including a plurality of annular light modulation portions 221 disposed on a common horizontal plane, the plurality of annular light modulation portions 221 has a common physical center 220; each of the plurality of annular light modulation portions 221 comprises a light incident surface 222 and a light modulation surface 223, wherein the light incident surface 222 is parallel to the backlight 10, the light modulation surface 223 and the light incident surface 222 have a preset acute included angle α, the light modulation surface 223 is disposed on a side of the light incident surface 222 away from the backlight 10, and an orthographic projection of the light modulation surface 223 on the light incident surface 222 covers the light incident surface 222; wherein in the plurality of annular light modulation portions 221, the light modulation surface 223 corresponding to each of the plurality of annular light modulation portions 221 is connected to an end of a corresponding light incident surface 222 away from a physical center 220, and in a direction from the physical center 220 to the annular light modulation portion, a degree of an acute included angle α between the light modulation surface 223 and the light incident surface 222 is sequentially increased; or, in the plurality of annular light modulation portions 221, a light modulation surface 223 corresponding to each of the plurality of annular light modulation portions 221 is connected to an end of a corresponding light incident surface 222 near the physical center 220, and in the direction from the physical center 220 to the annular light modulation portion, the degree of the acute included angle α between the light modulation surface 223 and the light incident surface 222 is sequentially increased. The display device includes two display modules symmetrically arranged, each display module including a display panel and a backlight module as described above.

It should be noted that the backlight module in embodiment 2 of the present application is similar to the backlight module in embodiment 1 of the present application. Details of the same parts are not described in embodiment 2 of the present application, except that in a direction perpendicular to the backlight, a cross-section of the annular light modulation portion 221 passing through the physical center 220 is a right triangle 224, and the right triangle 224 includes a first straight side 225, a first hypotenuse 227, and a second straight side 226, wherein the first straight side 225 corresponds to the light incident surface 222, and the first hypotenuse 227 corresponds to the light modulation surface 223, wherein in the direction form the physical center 220 to the annular light modulation portion 221, the cross-sections of the annular light modulation portions 221 arranged in a plurality of right triangles 224 in sequence, and in the plurality of right triangles 224 arranged in sequence, the lengths of the first right edges 225 are equal, and the lengths of the second straight side 226 are gradually increased.

In the backlight module provided in the present application, since the lengths of the first straight sides 225 are equal and the lengths of the second straight sides 226 are gradually increased in the direction form the physical center 220 to the annular light modulation portion 221, so that in the direction from the physical center 220 to the annular light modulation portion 221, the convergence ability or the divergence ability of each right angle triangle 224 to the emitted light of the backlight 10 are gradually increased, that is, when the light modulation manner of the right angle triangle 224 to the emitted light of the backlight 10 is the convergence type, the convergence ability of the annular light modulation portion 221 to the emitted light of the backlight 10 is gradually increased with the distance from the physical center 220 is greater, so that the brightness of the backlight module further away from the physical center 220 can be enhanced, thereby a problem in the related art that the brightness at the off-center field of view is low is alleviated; when the light modulation manner of the right angle triangle 224 to the emitted light of the backlight 10 is the divergence type, the divergence ability of the annular light modulation portion 221 to the emitted light of the backlight 10 is gradually enhanced with the distance from the physical center 220 is greater, so that the brightness of the backlight module further away from the physical center 220 can be enhanced, thereby the problem of low brightness at the off-center field of view in the related art is alleviated.

Referring to FIG. 10, in the backlight module provided in the present application, a first straight side 225 of each right triangle 224 is provided at a side of a second straight side 226 of each right triangle 224 away from the physical center 220. In this case, the right triangle 224 modulates the emitted light from the backlight 10 to be of a convergence type, and the field of view of the display device corresponding to the right triangle 224 is less than 90°. In this case, in the direction from the physical center 220 to the annular light modulation portion 221, the lengths of the second straight sides 226 are gradually increased, so that the convergence ability of the annular light modulation portion 221 to the emitted light of the backlight 10 is gradually enhanced with the distance from the physical center 220, whereby the brightness of the backlight module further away from the physical center 220 can be enhanced, thereby the problem of low brightness at the off-center field of view in the related art is alleviated.

Referring to FIG. 11, in the backlight module provided in the present application, a first straight side 225 of each right triangle 224 is provided at a side of a second straight side 226 of each right triangle 224 away from the physical center 220. In this case, the right triangle 224 modulates the emitted light from the backlight 10 to be of a divergence type, and the field of view of the display device corresponding to the right triangle 224 is greater than 90°. In this case, in the direction from the physical center 220 to the annular light modulation portion 221, the lengths of the second straight sides 226 are gradually increased, so that the convergence ability of the annular light modulation portion 221 to the emitted light of the backlight 10 is gradually enhanced with the distance from the physical center 220, whereby the brightness of the backlight module further away from the physical center 220 can be enhanced and the problem of low brightness at the off-center field of view in the related art is alleviated.

In some embodiments of the present application, in each of the right triangles 224, the length of the first straight side 225 is less than the length of the second straight side 226, wherein the ratio of the first straight side 225 to the second straight side 226 is less than 0.6.

In some embodiments of the present application, an emitted light of the backlight comprises a first emitted light, an included angle $\gamma$ is defined between the first emitted light and a normal direction of the backlight, wherein $\gamma$ is ranging from $-1°$ to $1°$, an emitted light emitted from the annular light modulation portion 221 after the first emitted light is deflected by the annular light modulation portion is a second emitted light, an included angle between the second emitted light and the normal direction of the backlight is $\beta$, wherein in the direction from the physical center 220 to the annular light modulation portion, $\beta$ corresponding to the plurality of annular light modulation portions 221 sequentially arranged is gradually increased, and $\beta$ is ranging from 0° to 13°.

In some embodiments of the present application, in a direction form the physical center 220 to the annular light modulation portion 221, the cross-sections of the plurality of the annular light modulation portions 221 are arranged in sequence to define right triangles in number of z, wherein z is satisfied with: $50 \leq z \leq 100$.

In some embodiments of the present application, in the direction form the physical center 220 to the annular light modulation portion 221, the lengths of the first straight sides 225 are all the same, and the lengths of the second straight sides 226 are gradually increased; wherein in the direction form the physical center 220 to the annular light modulation portion 221, a length difference between two adjacent second straight sides 226 is b, wherein b is satisfied with: $0.003 < b < 0.03$.

Specifically, since both the refractive index of the substrate 21 and the refractive index of the light modulation layer 22 are constant, in a case that the angle $\gamma$ of the first emitted light relative to a direction perpendicular to the normal direction of the backlight is fixed and the length of the first straight side 225 are fixed, the length of the first straight side 226 is positively related to the value of $\beta$. According to the present application, by controlling the length difference between two adjacent second straight sides 226 within the range of 0.003 to 0.03, it is possible to control the angle difference a between two $\beta$ corresponding to two adjacent annular light modulation portions 221 by using the length difference between two adjacent second straight sides 226, thereby achieving the purpose of controlling the light deflection capability of each annular light modulation portion 221, and improving the optical utilization rate of the backlight module more easily and efficiently.

In summary, the present application provides a backlight module including a backlight and an angular deflection film, the backlight having a light output side, the angular deflection film is disposed on the light output side of the backlight, and the angular deflection film being parallel to the backlight; the angular deflection film includes a light modulation layer including a plurality of annular light modulation portions disposed on a common horizontal plane, the plurality of annular light modulation portions having a common physical center; the annular light modulation part comprises a light inlet face and a light modulation face, wherein the light inlet face is parallel to the backlight, a preset acute angle is defined between the light modulation surface and the light incident surface, the light modulation face is arranged on one side of the light inlet face far away from the backlight, and the orthographic projection of the light modulation face on the light inlet face covers the light inlet face; wherein in the plurality of annular light modulation portions, the light modulation surfaces corresponding to each annular light modulation portion are connected to one end of each annular light modulation portion corresponding to each annular light modulation portion that is far away from the physical center, and the degree of the acute angle between the light modulation surface and the light-entering surface is sequentially increased in the direction from the physical center to the outer annular light modulation portion; Or, in the plurality of annular light modulation portions, each of the light modulation surfaces corresponding to each of the annular light modulation portions is connected to one end of each of the annular light modulation portions corresponding to each of the annular light modulation portions that is close to the physical center, and in the direction from the physical center to the outer annular light modulation portion, the degree of the angle between the light modulation surfaces and the acute angle between the light modulation surfaces is sequentially increased. According to the backlight module provided in the present application, in a plurality of annular light modulation portions, a light modulation surface corresponding to each annular light modulation portion is connected to one end of the corresponding light incident surface far away from a physical center, or a light modulation surface corresponding to each annular light modulation portion is connected to one end of the corresponding light incident surface near the physical center, and in a direction from the physical center to an outer annular light modulation portion, degrees of acute angle included between the light modulation surface and the light incident surface are sequentially increased, so that the emitted light emitted from the annular light modulation portion farther away from the physical center can be deflected by a larger angle, thereby improving brightness of an edge region of the light modulation layer and improving light efficiency utilization rate of the backlight module.

The present application is described in detail with reference to a backlight module and a display device according to some embodiments of the present application, and the principles and embodiments of the present application are described herein using specific examples. The description of the above embodiments is merely provided to help understand the method of the present application and the core idea thereof. Meanwhile, for those skilled in the art, there may be changes in specific implementation methods and application scope based on the ideas of the application. In view of the foregoing, the present description should not be construed as limiting the application.

What is claimed is:

1. A backlight module, wherein the backlight module comprises:

a backlight having a light output side;

an angular deflection film disposed on the light output side of the backlight, wherein the angular deflection film is parallel to the backlight; the angle deflection film comprises a light modulation layer including a plurality of annular light modulation portions disposed on a common horizontal plane; the plurality of annular light modulation portions has a common physical center; each of the plurality of annular light modulation portions comprises a light incident surface and a light modulation surface, the light incident surface is parallel to the backlight, a preset acute angle is defined between the light modulation surface and the light incident surface, the light modulation surface is disposed on a side of the light incident surface away from the backlight, and an orthographic projection of the light modulation surface on the light incident surface covers the light incident surface;

wherein in the plurality of annular light modulation portions, the light modulation surface of each of the plurality of annular light modulation portions is connected to an end of a corresponding light incident surface pointing away from a physical center, and in a direction from the physical center to the annular light modulation portion, a degree of an acute angle between the light modulation surface and the light incident surface is sequentially increased;

or, in the plurality of annular light modulation portions, the light modulation surface of each of the plurality of annular light modulation portions is connected to an end of a corresponding light incident surface pointing toward the physical center, and in the direction from the physical center to the annular light modulation portion, the degree of the acute angle between the light modulation surface and the light incident surface is sequentially increased, wherein an emitted light of the backlight comprises a first emitted light, an included angle γ is defined between the first emitted light and a normal direction of the backlight, wherein the included angle γ ranges from −1° to 1°, an emitted light emitted from the annular light modulation portion after the first emitted light is deflected by the annular light modulation portion is a second emitted light, an included angle β is defined between the second emitted light and the normal direction of the backlight, wherein in the direction from the physical center to the annular light modulation portion, included angles β corresponding to the plurality of annular light modulation portions sequentially arranged are gradually increased, and the included angle β ranges from 0° to 13°, wherein in the direction form the physical center to the annular light modulation portion, an angle difference between included angles β corresponding to two adjacent annular light modulation portions is a, wherein a is satisfied with: 0.018°<a<0.25°.

2. The backlight module of claim 1, wherein in a direction perpendicular to the backlight, in any cross-section passing through the physical center, for each annular light modulation portion of the plurality of annular light modulation portions, the acute angle between the light modulation surface and the light incident surface is constant.

3. The backlight module of claim 2, wherein an orthographic projection of an edge of the annular light modulation portion on the backlight is circular.

4. The backlight module of claim 3, wherein in the direction perpendicular to the backlight, a cross-section for each annular light modulation portion of the plurality of annular light modulation portions passing through the physical center is a right triangle, the right triangle comprises a first straight side, a first hypotenuse, and a second straight side, wherein the first straight side corresponds to the light incident surface, and the first hypotenuse corresponds to the light modulation surface, wherein:

in the direction from the physical center to the annular light modulation portion, the cross-section of the plurality of annular light modulation portions is arranged in sequence to define a plurality of right triangles, and in the plurality of right triangles arranged in sequence, lengths of the first straight sides are equal, and lengths of the second straight sides are gradually increased;

or, in the direction from the physical center to the annular light modulation portion, the cross-section of the plurality of annular light modulation portions is arranged in sequence to define a plurality of right triangles, and in the plurality of right triangles arranged in sequence, the lengths of the first straight sides are equal, and the lengths of the first straight sides are gradually decreased.

5. The backlight module of claim 4, wherein the angular deflection film further comprises a substrate provided on the light output side of the backlight, the light modulation layer is provided on a side of the substrate away from the backlight, and the light incident surface is adjacent to a surface of the substrate away from the backlight, and a refractive index of the substrate is different from a refractive index of the light modulation layer.

6. The backlight module of claim 5, wherein the refractive index of the substrate is greater than the refractive index of the light modulation layer.

7. The backlight module of claim 4, wherein in each of the right triangles, a length of the first straight side is greater than a length of the second straight side, and a ratio of the second straight side to the first straight side is less than 0.6.

8. The backlight module of claim 7, wherein the refractive index of the annular light modulation portion is n, and the acute included angle is α, and a formula is satisfied with:

$$\tan\alpha = \frac{\sin\beta - \sin\gamma}{\sqrt{n^2 - (\sin\gamma)^2} - \cos\beta}.$$

9. The backlight module of claim 8, wherein in the direction form the physical center to the annular light modulation portion, an angle difference between an included angle β corresponding to a x-th annular light modulation portion and an included angle β corresponding to a x+1-th annular light modulation portion is greater than an angle difference between an included angle β corresponding to a y-th annular light modulation portion and an included angle β corresponding to a y+1-th annular light modulation portion, wherein x and y are satisfied with: x>y≥1.

10. The backlight module of claim 1, wherein in the direction form the physical center to the annular light modulation portion, the cross-sections of the plurality of the annular light modulation portions are arranged in sequence to define right triangles in number of z, wherein z is satisfied with: 50≤z≤100.

11. The backlight module of claim 1, wherein in the direction form the physical center to the annular light modulation portion, lengths of the first straight sides are equal, and lengths of the second straight sides are gradually increased;

wherein in the direction form the physical center to the annular light modulation portion, a length difference between two adjacent second straight sides is b, wherein b is satisfied with: 0.003 mm<b<0.03 mm.

12. The backlight module of claim 1, wherein in the direction form the physical center to the annular light modulation portion, lengths of the second straight sides are equal, and lengths of the first straight sides are gradually decreased;

wherein in the direction form the physical center to the annular light modulation portion, a length difference between two adjacent first straight sides is c, wherein c is satisfied with: 0.04 mm<c<2 mm.

13. The backlight module of claim 1, wherein the backlight comprises a reflective sheet, an array of light emitting cells, and a diffuser sheet, wherein the array of light emitting cells is disposed on a side of the reflective sheet, the diffuser sheet is disposed on a side of the array of light emitting cells away from the reflective sheet, wherein a side of the diffuser sheet away from the array of light emitting cells is the light output side.

14. The backlight module of claim 1, wherein the backlight comprises a lamp bar, a light guide plate, and a prism film, wherein at least one end of the light guide plate is provided with the lamp bar, and the prism film is provided on a side of the light guide plate, wherein a side of the prism film away from the light guide plate is the light output side.

15. A display device, wherein the display device comprises two display modules symmetrically arranged, each of the two display modules comprises a display panel and a backlight module, wherein the backlight module comprises:

a backlight having a light output side;

an angular deflection film disposed on the light output side of the backlight, wherein the angular deflection film is parallel to the backlight; the angle deflection film comprises a light modulation layer including a plurality of annular light modulation portions disposed on a common horizontal plane; the plurality of annular light modulation portions has a common physical center; each of the plurality of annular light modulation portions comprises a light incident surface and a light modulation surface, the light incident surface is parallel to the backlight, a preset acute angle is defined between the light modulation surface and the light incident surface, the light modulation surface is disposed on a side of the light incident surface away from the backlight, and an orthographic projection of the light modulation surface on the light incident surface covers the light incident surface;

wherein in the plurality of annular light modulation portions, the light modulation surface of each of the plurality of annular light modulation portions is connected to an end of a corresponding light incident surface pointing away from a physical center, and in a direction from the physical center to the annular light modulation portion, a degree of an acute angle between the light modulation surface and the light incident surface is sequentially increased;

or, in the plurality of annular light modulation portions, the light modulation surface of each of the plurality of annular light modulation portions is connected to an end of a corresponding light incident surface pointing toward the physical center, and in the direction from the physical center to the annular light modulation portion, the degree of the acute angle between the light modulation surface and the light incident surface is sequentially increased, wherein an emitted light of the backlight comprises a first emitted light, an included angle γ is defined between the first emitted light and a normal direction of the backlight, wherein the included angle γ ranges from −1° to 1°, an emitted light emitted from the annular light modulation portion after the first emitted light is deflected by the annular light modulation portion is a second emitted light, an included angle β is defined between the second emitted light and the normal direction of the backlight, wherein in the direction from the physical center to the annular light modulation portion, included angles β corresponding to the plurality of annular light modulation portions sequentially arranged are gradually increased, and the included angle β ranges from 0° to 13°, wherein in the direction form the physical center to the annular light modulation portion, an angle difference between included angles β corresponding to two adjacent annular light modulation portions is a, wherein a is satisfied with: 0.018°<a<0.25°.

16. The display device of claim 15, wherein in the direction perpendicular to the backlight, a cross-section of the annular light modulation portion passing through the physical center is a right triangle, the right triangle comprises a first straight side, a first hypotenuse, and a second straight side, wherein the first straight side corresponds to the light incident surface, and the first hypotenuse corresponds to the light modulation surface, wherein in the direction from the physical center to the annular light modulation portion, the cross-section of the plurality of annular light modulation portions is arranged in sequence to define a plurality of right triangles, and in the plurality of right triangles arranged in sequence, lengths of the first straight sides are equal, and lengths of the second straight sides are gradually increased.

17. The display device of claim 15, wherein in the direction perpendicular to the backlight, a cross-section of the annular light modulation portion passing through the physical center is a right triangle, the right triangle comprises a first straight side, a first hypotenuse, and a second straight side, wherein the first straight side corresponds to the light incident surface, and the first hypotenuse corresponds to the light modulation surface, wherein in the direction from the physical center to the annular light modulation portion, the cross-section of the plurality of annular light modulation portions is arranged in sequence to define a plurality of right triangles, and in the plurality of right triangles arranged in sequence, the lengths of the first straight sides are equal, and the lengths of the first straight sides are gradually decreased.

18. The display device of claim 15, wherein the backlight comprises a reflective sheet, an array of light emitting cells, and a diffuser sheet, wherein the array of light emitting cells is disposed on a side of the reflective sheet, the diffuser sheet is disposed on a side of the array of light emitting cells away from the reflective sheet, wherein a side of the diffuser sheet away from the array of light emitting cells is the light output side.

19. The display device of claim 15, wherein the backlight comprises a lamp bar, a light guide plate, and a prism film, wherein at least one end of the light guide plate is provided with the lamp bar, and the prism film is provided on a side of the light guide plate, wherein a side of the prism film away from the light guide plate is the light output side.

* * * * *